United States Patent [19]

Aycock et al.

[11] Patent Number: 5,922,815
[45] Date of Patent: Jul. 13, 1999

[54] PROCESS FOR PRODUCING BLENDS OF TACKIFYING RESINS WITH LOW MOLECULAR WEIGHT POLYPHENYLENE ETHERS

[75] Inventors: David Frederick Aycock, Memphis, Tenn.; Gary Gelvin, Clifton Park; Marc G. Davidson, Slingerlands, both of N.Y.

[73] Assignee: General Electric Company, Pittsfield, Mass.

[21] Appl. No.: 08/990,952

[22] Filed: Dec. 15, 1997

[51] Int. Cl.[6] .......................... C08L 71/12; C08L 93/00; C08L 93/04
[52] U.S. Cl. ...................... 525/391; 524/270; 524/505; 524/508; 525/132; 525/133; 525/149; 525/905; 525/92 H; 523/436
[58] Field of Search ...................... 524/270, 271, 524/272, 273, 274, 508, 505, 549; 525/132, 133, 149, 391, 905, 92 H; 523/436

[56] References Cited

U.S. PATENT DOCUMENTS

| | | | |
|---|---|---|---|
| H1735 | 6/1998 | Hansen et al. | 524/505 |
| 5,159,004 | 10/1992 | Furuta et al. | 524/508 |
| 5,182,151 | 1/1993 | Furuta et al. | 525/391 |
| 5,206,281 | 4/1993 | Furuta et al. | 524/425 |

*Primary Examiner*—Peter A. Szekely

[57] ABSTRACT

The present invention provides an improved process for producing blends of tackifying resins and low molecular weight polyphenylene ether resins. This invention involves combining the resin solutions or redissolving one of the resins once isolated, in the other resin solution and isolation of the resin blend by devolatilization, precipitation, evaporation, spray drying, and/or stripping of the organic solvent.

7 Claims, No Drawings

PROCESS FOR PRODUCING BLENDS OF TACKIFYING RESINS WITH LOW MOLECULAR WEIGHT POLYPHENYLENE ETHERS

CROSS-REFERENCE TO RELATED APPLICATIONS

Not applicable.

FEDERALLY SPONSORED RESEARCH

Not applicable.

BACKGROUND OF THE INVENTION

1. Field of the Invention

The invention relates generally to processes for producing blends of tackifying resins and polyphenylene ether resins, preferably low molecular weight polyphenylene ether resins, that provide advantages in reducing processing temperatures and the number of processing steps during production of thermoplastic elastomer formulations which involve both components as additives.

2. Brief Description of the Related Art

Polyphenylene ether resins (PPE) are polymers of high performance engineering thermoplastics having relatively high molecular weights and possessing high melt viscosities and softening points—i.e., Tg equals 150–210° C., viscosity greater than about $40 \times 10^4$ poise at 200° C. It is known in the art that properties of the polyphenylene ether resins can be materially altered by blending them with other resins. Low molecular weight polyphenylene resin is much preferred over the commercially available higher molecular weight resin in certain applications, since it has been known that adhesives containing the lower molecular weight resin have higher service temperatures.

A number of composition patents are related to blends of thermoplastic elastomers, PPEs, and tackifiers, with or without additional components in the blend. For example, in Hanson, U.S. Pat. No. 4,104,323, an adhesive composition is prepared by melt blending a PPE resin, a styrene-diene block copolymer, and a tackifying resin without the use of a solvent and at a temperature that does not result in damage to the block copolymer. This patent teaches melt blending the PPE with the tackifying resin prior to to combining with the styrene-diene block copolymer. Further, it is taught that very high PPE quantities are not preferred due to limitations in mixing.

Akiyama, U.S. Pat. No. 4,772,657, disclosed that compositions of hydrogenated block copolymer with super-high-molecular-weight high density polyethylene, when combined with the polyphenylene ether resin and the oil, give rubber-like compositions superior in the oil resistance and compression set at 100° C.

Vermeire, U.S. Pat. No. 5,278,220, disclosed a polymeric composition containing a block copolymer, a thermoplastic engineering polymer and a poly(alkylene) plasticizer of a particular type. These compositions exhibited improved physical properties including retention during aging of tensile strength, color stability and low volatility upon exposure to heat and/or light.

Chu, Intl. Pat. Appl. WO 97 11,997, Apr. 3, 1997, disclosed use of a preblend of polyphenylene ether and a resin compatible with the B-block of an A-B-A block copolymer as a means of delivering more polyphenylene ether into adhesive formulations comprised of these materials.

The above references teach a number of polymeric compositions used for a number of purposes. A principal problem with the compositions of the above references is that the conventional processing technique is not as efficient and more expensive than the present invention because of the increased use of energy expended to make the polymeric composition. The conventional process technique consists of isolating each resin from a solvent by devolatization, evaporation, precipitation, and/or stripping before combining both of the resins together. To obtain a mixture of these two resins the help of heat at high temperatures is required. The temperatures involved in melt-blending the components also leads to degradation and crosslinking of the resins. Thus, it would be an advantage to process these compositions at a more efficient rate and at less energy in a way to protect the integrity of the resulting polymeric compositions.

A new improved process has been discovered that permits blending of tackifying resins and PPE, preferably low molecular weight PPE, at a reduced processing temperature, and reduced processing steps during the production of thermoplastics elastomer formulations which involve both components as additives.

SUMMARY OF THE PRESENT INVENTION

The present invention provides an improved process for producing blends of tackifying resins with polyphenylene ether resins without the conventional production step of isolating each component from a solvent. The polyphenylene ether resins are preferably low molecular weight polyphenylene ether resins. This method comprises first of combining one resin, either neat or, preferably, in a solution comprised primarily of the resin and an appropriate solvent, with a solution comprised primarily of the other resin and optionally, an appropriate solvent. If two solutions are used, it is preferable but not necessary that the same solvent is used in both solutions. Generally, the solvent is an aromatic solvent. The two resins, once combined, are then mixed to obtain good dispersion. If a neat resin is used, adequate time and temperature must be provided to dissolve the resin into solution. The resulting solution comprised primarily of the two resins and one or more solvents is then fed to solvent removal equipment where the solvent(s) is removed by devolatilization, evaporation, and/or stripping. The resulting mixture is cooled to form a solid and can be utilized further in thermoplastics elastomer formulations and shaped to the desired form.

An advantage of the present invention is that the need for melt processing of two components is reduced or eliminated thereby reducing manufacturing costs, complexity, and the thermal history of the components. Additionally, a wider range of PPE to tackifying resin ratio can be utilized than is possible with melt mixing.

Another advantage of the present invention is that isolating the resins from the solution simultaneously ensures homogeneity of the resin blend.

Also, another advantage of the present invention is that this process minimizes the potential for degradative reaction of the components by reducing processing temperatures and the amount of processing time at elevated temperatures.

These and other objects and advantages of the present invention will no doubt become obvious to those of ordinary skill in the art after having read the following description of the preferred embodiments.

DETAILED DESCRIPTION OF THE PREFERRED EMBODIMENTS

The process scheme herein contemplated comprises blending the polyphenylene ether resin with a terpene resin with each resin either neat or, preferably, in solution with one or more solvents. The solvents are generally aromatic solvents such as, for example, toluene.

The PPE are resins having an intrinsic viscosity of less than about 0.50 deciliters per gram, preferably less than about 0.30 deciliters per gram, when measured in solution in chloroform at 30° C. In one especially preferred embodiment, the PPE are low molecular weight resins having an intrinsic viscosity of less than about 0.25 deciliters per gram when measured in solution in chloroform at 30° C. In another especially preferred embodiment, the low molecular weight PPE are low molecular weight resins having an intrinsic viscosity of less than about 0.20 deciliters per gram when measured in solution in chloroform at 30° C.

The PPE preferably comprise the formula:

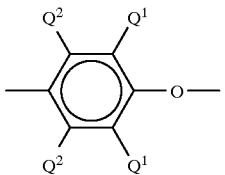

(I)

wherein for each structural unit, each $Q^1$ is independently halogen, primary or secondary lower alkyl (e.g., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Preferably, each $Q^1$ is alkyl or phenyl, especially $C_{1-4}$ alkyl, and each $Q^2$ is hydrogen.

Both homopolymer and copolymer PPE are included. The preferred homopolymers are those containing 2,6-dimethyl-1,4-phenylene ether units. Suitable copolymers include random copolymers containing, for example, such units in combination with 2,3,6-trimethyl-1,4-phenylene ether units. Also included are PPE containing moieties prepared by grafting vinyl monomers or polymers such as polystyrenes, as well as coupled PPE in which coupling agents such as low molecular weight polycarbonates, quinones, heterocycles and formals undergo reaction in known manner with the hydroxy groups of two PPE chains to produce a higher molecular weight polymer.

It will be apparent to those skilled in the art from the foregoing that the PPE contemplated for use in the present invention include all those presently known, irrespective of variations in structural units or ancillary chemical features.

In general, the PPE of this invention can be prepared by the following procedures fully described in U.S. Pat. Nos. 3,306,874 and 3,257,375, which herein incorporated by reference. The PPE are self-condensation products of monohydric monocyclic phenols typically produced by reacting the phenols in the presence of a complexing agent or complex metal, e.g., copper catalyst. Usually, the molecular weight will be controlled by the reaction time with longer times providing a higher average number of repeating structural units. For lower molecular weight PPE, at some target point before intrinsic viscosity of 0.35 deciliters per gram, is obtained, the reaction is terminated. Obviously, for higher molecular weight PPE, the reaction is continued until the desired higher molecular weight is achieved. Termination can be brought about by conventional means such as stopping the flow of oxygen to the reaction mixture or through the use of chain capping agents. Likewise, in the case of reaction systems which make use of complex metal catalysts, the polymerization reaction can be terminated by adding an acid, e.g., hydrochloric or sulfuric acid, or the like, or a base, e.g., lime sodium hydroxide, potassium hydroxide, and the like, or the product is separated from the catalyst by filtration, precipitation, or other suitable means.

Alternatively, the desired molecular weight PPE can be obtained by producing polymer of higher molecular weight and then lowering the molecular weight via redistribution chemistry with an appropriate phenol.

The term "terpene" as used herein means a mixture of hydrocarbons of the general formulae $C_{10}H_{16}$ or $C_{15}H_{24}$ usually found in association with turpentine or citrus extracts or derived therefrom.

The tackifiers suitable for use in the composition of the invention include any tackifier which is compatible with the composition and which imparts substantial adhesive performance benefit to the composition when the composition is applied as a hot melt adhesive to a substrate of, for example, aluminum, nylon, glass, galvanized steel, polypropylene, polyvinyl chloride, or polyacrylonitrile-butadiene-styrene. As used herein, by the term tackifier is meant resins such as, for example, rosin and its derivatives, terpene resins, aromatic hydrocarbon resins and aliphatic hydrocarbon resins.

These tackifiers typically have a ring and ball softening point of about 25°–180° C. These tackifiers and the methods for preparing them are well known in the art.

By compatible is meant that a molten mixture consisting substantially only of the tackifier and the copolymer is not subject to phase separation and does not exhibit a significant increase or decrease in viscosity upon standing.

The term "tack" as used herein means the property of an adhesive to adhere to a surface under light pressure such that an appreciable force is required to effect a clean separation (see Dahlquist, Adhesion Fundamentals and Practice, Chem. and Ind., Chapter 5, 1966, pp. 143–151). Tackifiers are compounds or compositions which when added to the adhesive, enhance tack properties.

In one embodiment, the adhesive compositions of the invention are prepared by blending an elastomeric, polymeric resin base with the tackifier terpene-based esters. In preparing adhesive compositions of the present invention, the amounts of tackifier employed are an effective amount to provide tack. This amount, relative to the adhesive base, will vary with the base material.

The terpene resin that is blended with PPE resin can be either a terpene-based ester, a terpene ether, or mixtures of the foregoing.

The terpene-based esters used as tackifiers in the composition of the invention may be prepared by first forming the Diels-Alder adduct of a terpene diene or triene with acrylic acid, methacrylic acid, or other alpha-beta unsaturated acid and then reacting this adduct with a polyhydric alcohol. They may be prepared by the Diels-Alder reaction of a terpene diene or triene and a pre-formed acrylate-polyol ester. The reaction which occurs in the latter case may be illustrated by the schematic formulae:

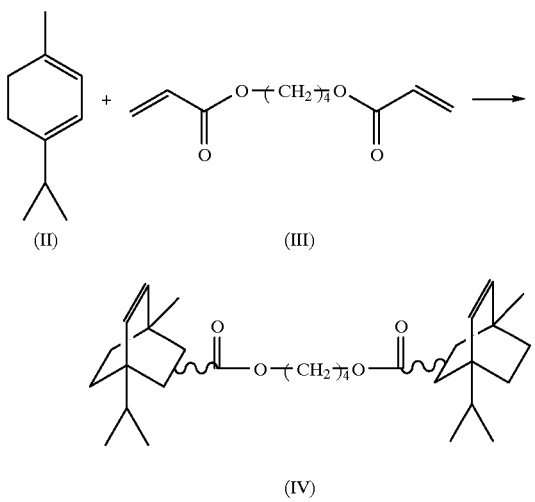

wherein (II) is alpha-terpinene, (III) is butanediol diacrylate and (IV) is the ester diadduct and wherein the wavy line represents attachment at the 5 (and 5') or 6 (and 6') positions of the bicyclo[2.2.2]octene moiety. The reaction proceeds by the Diels-Alder reaction of stoichiometric proportions of the terpene and the acrylate-polyol ester. The Diels-Alder reaction is a well known synthesis, details of which are given in Ber. 62, 2081–2087 (1929).

In general, the reaction is carried out for about 1 to 36 hours at a temperature of from about 40° C. to 250° C., preferably 100° C. to 170° C. But temperature conditions can be varied so as to obtain tackifiers with particular desirable characteristics. For example, heating at a low temperature, for example circa 80° C., for 24 hours, preserves acrylate groups, which are useful as "crosslinkable" groups with particular block elastomer base adhesive resins. The Diels-Alder reaction proceeds well under sub-atmospheric, super-atmospheric or ambient atmospheric pressures.

Upon completion of the reaction described above, the desired terpene-based esters may be separated from the reaction mixture by conventional techniques such as, for example, by extraction in solvent, washing, and stripping of solvent. Generally, the crude reaction mixture contains substantial proportions of excess reactant and co-products. According to a preferred embodiment of the invention, the excess reactants and co- or by-products may be allowed to remain in admixture with the desired terpene-based esters, for use as tackifiers as hereinafter described. Relatively pure terpene-based esters of the invention are not required for use as tackifiers.

The terpene resins employed typically will have a Ring and Ball softening point of about 10–150° C. and preferably about 70–120° C. Such resins generally are prepared by the polymerization of terpene hydrocarbons in the presence of Friedel-Crafts catalysts at moderately low temperatures; examples of commercially available resins of this type being the Nirez resins sold by the Reichhold Chemical Corp., the Piccolyte S-10, S-25, S-70, S-85, S-100, S-115, S-125, and S-135 resins as sold by the Hercules Chemical Corp, and the Zonatac series of resins sold by Arizona Chemical Co.

Terpene ethers are also useful for the present invention and are well known compounds. Terpene ethers are, in general, the reaction product obtained by the reaction of a terpene compound with a mono- or a polyhydric alcohol. Representative of such terpene ethers are those of the general formula: (V):

$$(HO)_{n-m}(R-O-T)_n \quad (V)$$

wherein T represents a terpene radical, R represents the residue of an alcohol or polyol after the removal of one or more hydroxyl groups, and m and n are integers of 1 to 8 and n is greater than or equal to m.

Advantageously, the terpene ether of the formula (V) given above will have an iodine value less than 20 and a molecular weight of more than about 270 up to about 1000; preferably greater than 400 and most preferably greater than 500. Most preferred are the oxidatively and thermally stable terpene ethers described hereinafter.

The terpene ethers of formula (V) are as stated above the reaction product of a mono- or polyhydric alcohol with a terpene.

The terpene compounds reacted with an alcohol to obtain the terpene ethers of formula (V) given above may be unsaturated monocyclic terpene compounds such as, for example dipentene, alpha-terpinene, beta-terpinene, sylvestrene, gamma-terpinene, alpha-phellandrene, beta-phellandrene, terpinolene, limonene, psilimonene, isolimonene, 1-menthene, cis-2 menthene, trans-2-menthene, 3-menthene, 4,8-menthane, or mixtures thereof; or it may be an unsaturated complex cyclic terpene, for example, alpha-pinene, beta-pinene, camphene, carene, tricyclene, cadinene, caryophyllene and bornylene; or it may be an unsaturated linear terpene, for example, allo-ocimene, citronellene, pseudocitronellene, ocimene, and myrcene. These terpene compounds need not be in the form of pure compounds, but may be reacted in crude form. Thus, in place of the several pure terpene compounds, crude natural mixtures of terpene compounds as, for example, turpentine, pine oil, etc., or mixtures of terpenes with petroleum or other saturated hydrocarbons may be used. Various fractions from these mixtures may also be used without the necessity of isolating the compounds in their pure state. The alcohol reactant employed to prepare the terpene ethers of formula (V) given above may be either monohydric or polyhydric. Representative polyhydric alcohols are, for example, ethylene glycol, 1,3-propanediol, 1,4-butanediol, 1,5-pentanediol, 1,6-hexanediol, a polyglycol as diethylene glycol, triethylene glycol, dipropylene glycol, dibutylene glycol, trimethylene glycol; isobutylene-ethylene glycol, trimethylene glycol; the monoethyl, monopropyl or monobutyl ethers of glycerol, dicyclopentadienyl dimethanol, pentaerythritol, dipentaerythritol, tripentaerythritol, trimethylolpropane, trimethylolethane, etc., glycerol, glycerol monoacetate, mannitol, sorbitol, xylose, etc., or mixtures thereof. Monohydric alcohols such as, for example, abietyl alcohol, pimarol, hydrogenated abietyl alcohol, hydropimarol, hydrogenated pyroabietyl alcohol, pyroabietyl alcohol, etc., or mixtures thereof.

In the practice of the present invention, if two solutions are used, it is preferable but not necessary that the same solvent is used in both solutions. The two resins, once combined, are then mixed to obtain good dispersion. If a neat resin is used, adequate time and temperature must be provided to dissolve the resin into solution. The resulting solution comprised primarily of the two resins and one or more aromatic solvents is then fed to solvent removal equipment where the solvent or solvents are removed by devolatilization, evaporation, spray drying, and/or stripping. The resulting tackifying polyphenylene ether resin mixture is cooled to form a solid and processed further with the desired elastomer using standard processing methods as known in the art.

The thermoplastics elastomer formulations of the present invention contain elastomeric resins, generally block copolymers. The block copolymers which form the base polymer for the adhesive and sealant compositions of the present invention are thermoplastic elastomers which are generally block copolymers of polystyrene and an elastomer, commonly polybutadiene, poly(ethylene-butylene), poly (ethylene-propylene), or hydrogenated polybutadiene. The block copolymers may be di-block, tri-block, or a mixture of various block structures and sizes. The block copolymers may be blocked, tapered, or radial in architecture as well as mixtures of architectures.

Some of the aspects of the present invention are illustrated by the following example.

EXAMPLE 1

Tackifying polyphenylene ether resin mixtures were prepared using 0.15 I.V. polyphenylene ether (PPO® resin 612 lot 9401-951-2) and Zonatac® 105, styrenated terpene resin with a softening point at about 105° C., from Arizona Chemical. In these examples, PPE or Zonatac® 105 were dissolved in toluene to produce 30 to 50% (by weight) solutions of the resin at 65° C. PPE and the terpene resin solutions were then blended in equal amounts to assess compatibility. In all cases, the solutions containing both resins were clear and homogeneous. Each solution containing both resins had a viscosity between those of the single-resin solutions from which it was prepared.

A film of a 1:1 weight ratio of PPE:tackifying resin was cast from a solution containing 20% 0.15 I.V. PPE, 20% terpene resin, and 60% toluene by removing the solvent in vacuo. The film was clear and light in color. In contrast, a 1:1 weight ratio of PPE and the same tackifying resin prepared by melt compounding was dark in color. The color of the PPE/tackifying resin composition is important as the color gets transferred to the final elastomer when the fully formulated composition is prepared. Very low color PPE/tackifying resin compositions are highly preferred.

What is claimed:

1. A method to prepare a polyphenylene ether resin composition containing a tackifying resin, wherein the tackifying resin is a terpene-based ester, a terpene ether, or mixtures of the foregoing, and wherein said method comprises mixing the polyphenylene ether resin and the tackifying resin in at least one organic solvent to produce a tackifying polyphenylene ether resin mixture and isolating the tackifying polyphenylene ether resin mixture by removal of the organic solvent.

2. The method of claim 1, wherein the polyphenylene ether resin has an intrinsic viscosity of less than about 0.30 deciliters per gram.

3. The method of claim 1, wherein the organic solvent comprises toluene.

4. The method of claim 1, wherein the tackifying resin has a softening point at about 70°–120° C.

5. The method of claim 1, wherein the at least one solvent is removed by devolatilization, evaporation, spray drying, stripping, or a combination of the foregoing.

6. A tackifying polyphenylene ether resin mixture prepared by the method of claim 1.

7. A thermoplastic elastomer composition comprising:

(a) a tackifying polyphenylene ether resin mixture and (b) an elastomeric resin;

wherein the tackifying polyphenylene ether resin mixture is prepared by a method comprising mixing a polyphenylene ether resin and a tackifying resin in at least one organic solvent to produce a tackifying polyphenylene ether resin mixture and isolating the tackifying polyphenylene ether resin mixture by removal of the organic solvent, wherein the tackifying resin is a terpene-based ester, a terpene ether, or mixtures of the foregoing.

* * * * *